United States Patent
Lafleur et al.

(10) Patent No.: US 10,421,877 B2
(45) Date of Patent: Sep. 24, 2019

(54) CORE-SHELL AQUEOUS LATEX

(71) Applicant: Rohm and Haas Company, Collegeville, PA (US)

(72) Inventors: Edward E. Lafleur, Holland, PA (US); Himal Ray, Collegeville, PA (US); Gaurav Pranami, Philadelphia, PA (US)

(73) Assignee: Rohm & Haas Company, Philadelphia, PA (US)

( * ) Notice: Subject to any disclaimer, the term of this patent is extended or adjusted under 35 U.S.C. 154(b) by 68 days.

(21) Appl. No.: 15/559,487

(22) PCT Filed: Mar. 23, 2016

(86) PCT No.: PCT/US2016/023661
§ 371 (c)(1),
(2) Date: Sep. 19, 2017

(87) PCT Pub. No.: WO2016/154238
PCT Pub. Date: Sep. 29, 2016

(65) Prior Publication Data
US 2018/0112099 A1 Apr. 26, 2018

Related U.S. Application Data

(60) Provisional application No. 62/137,434, filed on Mar. 24, 2015.

(51) Int. Cl.
| | | |
|---|---|---|
| *C09D 151/00* | (2006.01) | |
| *C08F 230/08* | (2006.01) | |
| *C08F 220/18* | (2006.01) | |
| *C08F 265/04* | (2006.01) | |
| *C09D 133/14* | (2006.01) | |
| *D06M 15/263* | (2006.01) | |
| *D06M 15/356* | (2006.01) | |
| *D06M 23/08* | (2006.01) | |
| *C08F 257/02* | (2006.01) | |
| *D06M 15/233* | (2006.01) | |

(52) U.S. Cl.
CPC ........ *C09D 151/003* (2013.01); *C08F 220/18* (2013.01); *C08F 230/08* (2013.01); *C08F 257/02* (2013.01); *C08F 265/04* (2013.01); *C09D 133/14* (2013.01); *D06M 15/233* (2013.01); *D06M 15/263* (2013.01); *D06M 15/3568* (2013.01); *D06M 23/08* (2013.01)

(58) Field of Classification Search
CPC .................................................. C08F 230/08
See application file for complete search history.

(56) References Cited

U.S. PATENT DOCUMENTS

| | | |
|---|---|---|
| 4,107,120 A | 8/1978 | Plamondon et al. |
| 4,351,875 A | 9/1982 | Arkens |
| 5,143,954 A | 9/1992 | Hutton et al. |
| 5,339,073 A | 8/1994 | Dodd et al. |
| 5,426,142 A | 6/1995 | Rosano et al. |
| 5,461,125 A | 10/1995 | Lu et al. |
| 5,478,601 A | 12/1995 | Larson et al. |
| 5,559,192 A | 9/1996 | Bors et al. |
| 5,708,093 A * | 1/1998 | Bastelberger ........... C04B 26/32 523/201 |
| 5,783,626 A | 7/1998 | Taylor et al. |
| 6,028,155 A | 2/2000 | Collins et al. |
| 6,117,492 A | 9/2000 | Goldstein et al. |
| 6,262,149 B1 | 7/2001 | Clark et al. |
| 6,417,267 B1 | 7/2002 | Stockl et al. |
| 6,506,696 B2 | 1/2003 | Goldstein et al. |
| 6,727,314 B2 | 4/2004 | Burghart et al. |
| 6,740,359 B2 | 5/2004 | Kumar et al. |
| 7,101,921 B2 | 9/2006 | Edwards et al. |
| 7,910,663 B2 | 3/2011 | Taylor et al. |
| 9,609,762 B2 | 3/2017 | Arai et al. |
| 2008/0028982 A1 | 2/2008 | Verge et al. |
| 2010/0028546 A1 | 2/2010 | Roschmann et al. |
| 2012/0095131 A1 | 4/2012 | Kinoshita et al. |
| 2012/0121903 A1 | 5/2012 | Betremieux et al. |
| 2012/0152459 A1 | 6/2012 | Avramidis |
| 2013/0146241 A1* | 6/2013 | Hong ..................... B01J 13/14 162/164.6 |
| 2014/0213692 A1* | 7/2014 | Zhang .................. C09D 133/14 523/122 |
| 2016/0200937 A1* | 7/2016 | Hu ........................ C09D 5/16 523/122 |

OTHER PUBLICATIONS

Tillet, et al., "Chemical reactions of polymer crosslinking and post-crosslinking at room and medium temperature", Progress in Polymer Science, vol. 36, pp. 191-212 (2011).

\* cited by examiner

*Primary Examiner* — Jeffrey C Mullis

(57) ABSTRACT

Provided is an aqueous composition comprising latex polymer particles that comprise
(a) 40% to 95%, by weight based on the dry weight of the latex polymer, a core polymer that comprises
 (i) polymerized units of one or more monofunctional vinyl monomers, and
 (ii) polymerized units of one or more multivinyl monomers, and
(b) 5% to 60%, by weight based on the dry weight of the latex polymer, a shell polymer that comprises
 (i) polymerized units of one or more monofunctional vinyl monomers, and
 (ii) polymerized units of one or more vinyl monomers having a latent crosslinking group selected from the group consisting of trialkoxysilyl groups, oxoacetyl groups, and mixtures thereof.

5 Claims, No Drawings

CORE-SHELL AQUEOUS LATEX

It is often desired to provide a latex polymer that, after being applied to a substrate, forms a film and also undergoes crosslinking. Such latex polymers are useful, for example, as treatments for woven or nonwoven textiles. In the past, some latex polymers have been used in which the crosslinking reaction that took place after application to the substrate caused the release of formaldehyde, which is undesirable. In the past, some latex polymers have been used that have required exposure to relatively high temperatures in order to undergo crosslinking after application to substrate, and such high temperatures are also undesirable.

U.S. Pat. No. 4,107,120 describes an acrylic emulsion polymer where the latex particles have a core-shell structure. The shell polymer in U.S. Pat. No. 4,107,120 is made using a latent crosslinking monomer, which, according to U.S. Pat. No. 4,107,120, is generally an amide or N-alkylolamide of an alpha, beta ethylenically unsaturated carboxylic acid. Such latent crosslinking monomers are known to produce formaldehyde during the crosslinking process that takes place after application to substrate. It is desired to provide a latex polymer that is capable of crosslinking after application to substrate and that has one or more of the following benefits: is capable of crosslinking at relatively low temperature after application to substrate; does not release formaldehyde during the crosslinking process; is stable during storage; and/or provides good tensile strength to a textile substrate.

The following is a statement of the invention.

An aspect of the present invention is an aqueous composition comprising latex polymer particles that comprise
- (a) 40% to 95%, by weight based on the dry weight of the latex polymer, a core polymer that comprises
  - (i) 95% to 100% by weight, based on the dry weight of the core polymer, polymerized units of one or more monofunctional vinyl monomers, and
  - (ii) 0% to 5% by weight, based on the dry weight of the core polymer, polymerized units of one or more multivinyl monomers, and
- (b) 5% to 60%, by weight based on the dry weight of the latex polymer, a shell polymer that comprises
  - (i) 35% to 95% by weight, based on the dry weight of the shell polymer, polymerized units of one or more monofunctional vinyl monomers, and
  - (ii) 5% to 65% by weight, based on the dry weight of the shell polymer, polymerized units of one or more vinyl monomers having a latent crosslinking group selected from the group consisting of trialkoxysilyl groups, oxoacetyl groups, and mixtures thereof.

The following is a detailed description of the invention.

As used herein, the following terms have the designated definitions, unless the context clearly indicates otherwise.

The glass transition temperature (Tg) of a material is determined by differential scanning calorimetry using the midpoint method and temperature scan rate of 10° C. per minute according to test method ASTM D7426-08 (American Society of Testing and Materials, Conshohocken, Pa., USA).

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Polymers have weight-average molecular weight (Mw) of 1000 or more. Polymers may have extremely high Mw; some polymers have Mw above 1,000,000; typical polymers have Mw of 1,000,000 or less. Some polymers are crosslinked, and crosslinked polymers are considered to have infinite Mw.

As used herein "weight of polymer" means the dry weight of polymer.

Molecules that can react with each other to form the repeat units of a polymer are known herein as "monomers." The repeat units so formed are known herein as "polymerized units" of the monomer.

When a monomer is said herein to have a Tg of a certain value, it is meant that a homopolymer made from that monomer has Tg of that value.

Vinyl monomers have the structure I:

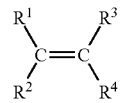

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth) acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. Substituted monomers include, for example, monomers with more than one carbon-carbon double bond, monomers with hydroxyl groups, monomers with other functional groups, and monomers with combinations of functional groups. (Meth)acrylates are substituted and unsubstituted esters or amides of (meth)acrylic acid.

As used herein, acrylic monomers are monomers selected from (meth)acrylic acid, aliphatic esters of (meth)acrylic acid, aliphatic esters of (meth)acrylic acid having one or more substituent on the aliphatic group, (meth)acrylamide, N-substituted (meth)acrylamide, and mixtures thereof.

As used herein, an "alkyl (meth)acrylate monomer" has the structure II

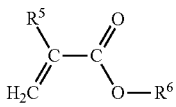

where $R^5$ is hydrogen or methyl, and $R^6$ is an alkyl group. As used herein, an "alkyl acrylate monomer" has structure II in which $R^5$ is hydrogen. As used herein, an "alkyl methacrylate monomer" has structure II in which $R^5$ is methyl.

As used herein, a monofunctional vinyl monomer is a vinyl monomer that has exactly one polymerizable vinyl group and that has no additional reactive groups. As used herein, a multivinyl monomer is a vinyl monomer that has two or more polymerizable vinyl groups and that has no additional reactive groups. As used herein, a latent crosslinking vinyl monomer is a vinyl monomer that has one or more polymerizable vinyl groups and that also has one or more reactive groups that do not react during vinyl polymerization but that are capable of undergoing a crosslinking reaction after the latex polymer has been applied to a substrate.

A trialkoxysilyl group is a monovalent group that has the structure III:

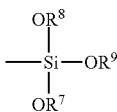

where $R^7$, $R^8$, and $R^9$ is each independently an alkyl group. An oxoacetyl group is a divalent group that has the structure IV:

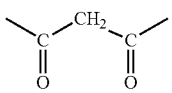

A polymer made by aqueous emulsion polymerization is known herein as a "latex" polymer. Latex polymers exist as particles distributed throughout a continuous aqueous medium.

A core-shell latex polymer is a latex polymer that is made in two or more polymerization stages. In one of the stages, an emulsion polymerization process is conducted to produce the "core" latex polymer particles. In a subsequent stage, an emulsion polymerization process is conducted in the presence of the core latex polymer particles to form the shell polymer. There is a period of time between the core-forming stage and the shell-forming stage in which no detectable polymerization takes place. In the formation of the shell polymer, half or more (by weight) of the shell polymer (based on the weight of the shell polymer) forms on the surfaces of the core latex polymer particles. The shell formed by the shell polymer covers the surface of the core polymer partially or completely. One or more additional polymerization stages are optionally conducted before the core polymer, or between the core polymer and the shell polymer, or after the formation of the shell polymer, or any combination thereof.

The amount of core polymer, by weight based on the weight of the latex polymer, is 40% or more; preferably 55% or more; more preferably 70% or more. The amount of core polymer, by weight based on the weight of the latex polymer, is 95% or less; preferably 90% or less; more preferably 85% or less.

In the core polymer, the amount of polymerized units of monofunctional vinyl monomer is, by weight based on the weight of core polymer, 95% or more; preferably 96% or more; more preferably 97% or more; more preferably 98% or more; more preferably 99% or more. In the core polymer, the amount of polymerized units of monofunctional vinyl monomer is, by weight based on the weight of core polymer, 100% or less.

In the core polymer, the amount of polymerized units of multivinyl monomer is, by weight based on the weight of core polymer, 5% or less; preferably 3% or less; more preferably 2% or less; more preferably 1% or less. In the core polymer, the amount of polymerized units of multivinyl monomer is, by weight based on the weight of core polymer, 0% or more.

For use in the core polymer, preferred monofunctional vinyl monomers are (meth)acrylate monomers, vinyl aromatic monomers, and mixtures thereof. Preferably the core polymer contains polymerized units of one or more alkyl (meth)acrylates. Preferably the core polymer contains polymerized units of one or more alkyl(meth)acrylates in which the alkyl group has 2 or more carbon atoms. Preferably the core polymer contains polymerized units of one or more alkyl (meth)acrylates in which the alkyl group has 12 or fewer carbon atoms; more preferably 10 or fewer carbon atoms; more preferably 8 or fewer carbon atoms. Preferably the core polymer contains polymerized units of one or more alkyl acrylates. Preferably the amount of polymerized units of alkyl acrylates in the core polymer, by weight based on the weight of the core polymer, is 25% or more; more preferably 35% or more; more preferably 45% or more. Preferably the amount of polymerized units of alkyl acrylates in the core polymer, by weight based on the weight of the core polymer, is 85% or less; more preferably 75% or less; more preferably 65% or less.

For use in the core polymer, among vinyl aromatic monomers, preferred are styrene, alpha-methyl styrene, and mixtures thereof; more preferred is styrene.

Preferably the core polymer contains polymerized units of one or more alkyl acrylate monomers each having Tg of below 20° C. and one or more additional monofunctional monomers each having Tg of 20° C. or above. Among monomers having Tg of 20° C. or above, preferred are those with Tg of 40° C. or above; more preferred are those with Tg of 60° C. or above; more preferred are those with 80° C. or above. Among monomers having Tg of 20° C. or higher, preferred are those selected from styrene and alkyl methacrylates in which the alkyl group in the alkyl methacrylate has 1 or 2 carbon atoms. When monomer having Tg of 20° C. or above is used in the core polymer, preferably the amount is, by weight based on the weight of the core polymer, 15% or more; more preferably 25% or more; more preferably 35% or more. When monomer having Tg of 20° C. or above is used in the core polymer, preferably the amount is, by weight based on the weight of the core polymer, 75% or less; more preferably 65% or less; more preferably 55% or less.

The amount polymerized units of multivinyl monomer in the core polymer is, by weight based on the weight of core polymer, 0 to 5%; preferably 0 to 3%; more preferably 0 to 2%; more preferably 0 to 1%.

Preferably the glass transition temperature (Tg) of the core polymer is 60° C. or lower; more preferably 50° C. or lower; more preferably 40° C. or lower. Preferably the Tg of the core polymer is 0° C. or higher; more preferably 10° C. or higher; more preferably 15° C. or higher.

Preferably, in the core polymer, the amount, by weight based on the dry weight of the core polymer, of all monomers other than alkyl (meth)acrylates, styrene, and multivinyl monomers, is 0-3%; more preferably 0-1%, more preferably 0-0.3%, more preferably 0-0.1%.

The amount of shell polymer, by weight based on the weight of the latex polymer, is 5% or more; preferably 10% or more; more preferably 15% or more. The amount of shell polymer, by weight based on the weight of the latex polymer, is 60% or less; preferably 45% or less; more preferably 30% or less.

The shell polymer contains polymerized units of one or more monofunctional vinyl monomer. Preferably the shell polymer contains polymerized units of one or more monofunctional monomer that has a Tg of 20° C. or higher; more preferably 40° C. or higher; more preferably 60° C. or higher; more preferably 80° C. or higher. Among monomers having Tg of 20° C. or higher, preferred are those selected from styrene and alkyl methacrylates in which the alkyl group of the alkyl methacrylate has 1 or 2 carbon atoms.

In the shell polymer, the amount of polymerized units of monofunctional vinyl monomer is, by weight based on the weight of shell polymer, 35% or more; preferably 45% or more; more preferably 55% or more; more preferably 65% or more. In the shell polymer, the amount of polymerized units of monofunctional vinyl monomer is, by weight based on the weight of shell polymer, 95% or less; preferably 85% or less.

The shell polymer contains polymerized units of one or more vinyl monomer having latent crosslinking groups, where the latent crosslinking groups are selected from trialkoxysilyl groups, oxoacetyl groups, and mixtures thereof. Trialkoxysilyl groups are preferred.

Among trialkoxysilyl groups, preferred are those having structure III in which $R^7$, $R^8$, and $R^9$ is each an alkyl group having 6 or fewer carbon atoms; more preferably 4 or fewer carbon atoms; more preferably 2 or fewer carbon atoms. More preferably, $R^7$, $R^8$, and $R^9$ is each a methyl group.

Among latent crosslinking monomers having trialkoxysilyl groups, preferred are those having structure V or structure VI:

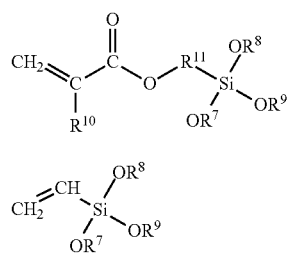

where $R^{10}$ is either H or methyl and $R^{11}$ is a divalent alkyl group. Among monomers having structure V, preferably $R^{10}$ is methyl. Monomers having structure V are known herein as trialkoxysilylalkyl (meth)acrylates. Monomers having structure VI are known herein as vinyl trialkoxysilanes. Among monomers having trialkoxysilyl groups, preferred are trialkoxysilylalkyl (meth)acrylates. Among monomers having structure V, preferably $R^{11}$ is a divalent alkyl group having 10 or fewer carbon atoms; more preferably 8 or fewer carbon atoms; more preferably 6 or fewer carbon atoms; more preferably 4 or fewer carbon atoms; more preferably 3 or fewer carbon atoms. Among monomers having structure V, preferably $R^{11}$ is a divalent alkyl group having 1 or more carbon atom; more preferably 2 or more carbon atoms; more preferably 3 or more carbon atoms.

In the shell polymer, the amount of polymerized units of vinyl monomer having a latent crosslinking group is, by weight based on the weight of shell polymer, 5% or more; preferably 15% or more. In the shell polymer, the amount of polymerized units of vinyl monomer having a latent crosslinking group is, by weight based on the weight of shell polymer, 65% or less; preferably 55% or less; more preferably 45% or less; more preferably 35% or less.

Preferably, in the shell polymer, the amount, by weight based on the dry weight of the shell polymer, of all monomers other than alkyl (meth)acrylates, styrene, and vinyl monomers having latent crosslinking groups selected from trialkoxysilyl groups, oxoacetyl groups, and mixtures thereof, is 0-3%; more preferably 0-1%, more preferably 0-0.3%, more preferably 0-0.1%.

It is preferable that the aqueous composition of the present invention is stable. Stability is assessed by measuring viscosity before and after storage. If the ratio of the viscosity after storage to the viscosity before storage remains in the range of 0.5:1 to 2:1, the composition is considered stable. Viscosity is measured at 25° C. with a Brookfield LV viscometer, spindle #2, at 60 rpm. Storage is conducted at 50° C. for 7 days.

Some preferred uses for the composition of the present invention include bringing the composition into contact with a textile, either woven or non-woven, then evaporating the water, either by exposure to moving air or by exposure to temperature above 25° C. or both. It is contemplated that during or after the evaporation of the water, the latent crosslinking groups will undergo chemical reactions with each other to form covalent bonds between polymer chains (including bonds between one portion of a specific polymer chain and a different portion of the same chain). It is expected that the bonds formed by the latent crosslinking groups will connect polymer chains residing in the same latex polymer particle and will also connect polymer chains residing in different latex polymer particles.

One preferred use of the aqueous composition of the present invention is as a binder for nonwoven textiles. That is, the aqueous composition of the present invention is brought into contact with a collection of fibers, preferably in the form of a flat mat; the fibers may or may not be bonded to each other prior to contact with the aqueous composition of the present invention. After the water has been evaporated from the aqueous composition of the present invention and the latent crosslinking has taken place, it is expected that the collection of fibers will have desirable physical properties such as relatively high tensile strength. It is desirable that the tensile strength be relatively high when the sample is tested in a dry condition, when the sample is wet with water, and when the sample is in contact with isopropyl alcohol (IPA).

Preferred fibers for nonwoven textiles are cellulosic fibers, synthetic fibers, and mixtures thereof. Nonwoven textiles may be used for any purpose, including, for example, for filtration and as wipes.

The following are examples of the present invention.

The monomers used in the following examples were as follows:

EA=ethyl acrylate
Sty=styrene
DVB=a mixture of approximately 80% divinyl benzene and 20% ethylvinyl benzene by weight
AAEM=acetoacetoxyethyl methacrylate
MATS=3-(trimethoxysilyl)propyl methacrylate
VTMS=vinyl trimethoxysilane The comparative polymers used were as follows:
Comp1=Primal™ 2310H binder, from Dow Chemical Company, produces formaldehyde during crosslinking
Comp2=Rhoplex™ ST-954 binder, from Dow Chemical Company, produces formaldehyde during crosslinking
Comp3=Eco™ 3482 binder, from Dow Chemical Company, does not produce formaldehyde during crosslinking, and does not have any trialkoxysilane groups or oxoacetyl groups.

Samples were prepared as follows. Whatman™ filter paper (4 CHR grade) was used as a fiber mat. The fiber mat was treated with the aqueous composition by dipping and padding using Brich Brothers padder (Brich Brothers Southern, Inc.). Samples were dried in a forced-air oven at 100 to 150° C. (the "cure temperature") for 3 minutes. The weight ratio of dry filter paper to dry polymer was approximately 100:15.

The tensile testing of the samples was conducted at approximately 23° C. as follows: Thwing Albert Tensile Tester EJA series instrument was used for tensile testing. Polymer coated fiber mat was cut in dimension of 10.16 cm (4 inch)×2.54 cm (1 inch) rectangle strips for tensile testing.
Gage Length=5.08 cm (2 inches)
Test Speed=30.08 cm/min (12 inches/min)
Sample Width=2.54 cm (1 inch)
Sample Thickness=0.025 mm (0.001 inch)
The maximum tensile force was recorded as the tensile strength, in units of grams of force per 2.54 cm of width (herein abbreviated "g/in").

All tensile testing was performed on sample strips of dipped and padded filter paper padded were prepared by the method described above. "Dry" tensile tests were performed on such sample strips without further preparation. For "Wet" and "IPA" tensile tests, 10 strips were soaked in either 60 grams of deionized (DI) water or 60 grams of isopropyl alcohol (IPA) for 30 minutes. Testing strips were patted dry using paper towel and tested for tensile strength as described above. "Wet" results are for samples soaked in DI water, and "IPA" results are for samples soaked in IPA.

EXAMPLE 1: COMPOSITIONS

The following Example compositions were made. Each was made in a 2-stage emulsion polymerization. In each sample, the weight ratio of dry first stage polymer to dry second stage polymer (that is, the weight ratio of core polymer to shell polymer) was 80:20.

The polymerization procedure was as follows: The reactor was charged with A, B and C, equipped with stirrer and condenser with nitrogen purge heated to 40° C. stirring at 150 RPM. Stage I monomer mix D was homogenized using OMNI™ 20 mm probe at 10K RPM for 3 minutes. At temperature, feed of D, E and F was begun and then continued over 90 minutes. After feed of D, E, and F had begun, the feed of G and H was begun and continued for 60 minutes. At end of feed, held for 15 minutes and maintained temperature of 80° C. Stage II monomer emulsion (ME) was homogenized using OMNI™ 20 mm probe at 10,000 RPM for 3 minutes. After hold, added J and started feed of I and K, which continued for 30 minutes. After 15 minutes into feed, began feeding L. At end of feeds, held for 15 minutes and cooled to 40° C.; and discharged through cheese cloth.

|   |   |   | Total Wt. |
|---|---|---|---|
|   | Stage I | | |
| A |   | DI H2O | 625.00 |
| B |   | 20211XP (Seed) | 82.62 |
|   |   | DI H2O rinse | 50.00 |
| C |   | 20007XP (Seed) | 263.74 |
|   |   | DI H2O rinse | 50.00 |
| D- Stage I ME |   | DI H2O | 83.92 |
|   |   | Sodium Laurel Sulfate (polystep B 5 N) 28% | 60.32 |
|   |   | Sodium Sulfate | 1.65 |
|   |   | Sodium Carbonate | 0.55 |
|   |   | DiVinyl Benzene | 7.30 |
|   |   | Ethyl Acrylate | 661.99 |
|   |   | Styrene | 373.22 |
|   |   | DI H2O rinse | 100.00 |
| E |   | Iso-Ascorbic Acid | 1.36 |
|   |   | DI H2O | 43.64 |
| F |   | t-ButylHydroPeroxide-70% | 1.11 |
|   |   | DI H2O | 43.89 |
| G |   | Iso-Ascorbic Acid | 1.08 |
|   |   | DI H2O | 28.92 |
| H |   | t-ButylHydroPeroxide-70% | 0.89 |
|   |   | DI H2O | 29.11 |
|   |   | % Solids = | 2481.19 |
|   | Stage II | | |
| I - Stage II ME |   | STY | 225.00 |
|   |   | MATS | 75 |
|   |   | Sodium Carbonate | 0.6 |
|   |   | Sodium Laurel Sulfate (polystep B 5 N) 28% | 6 |
|   |   | DI H2O rinse | 50.00 |
| J |   | Sodium persulfate | 0.81 |
|   |   | DI H2O | 20.00 |
| K |   | Iso-Ascorbic Acid | 2.27 |
|   |   | DI H2O | 27.73 |
| L |   | t-ButylHydroPeroxide-70% | 1.43 |
|   |   | DI H2O | 13.57 |
|   |   | % Solids = | 2883.43 |

Polymer compositions were as follows. Weight ratio of core polymer to shell polymer was 80:20.

| Example | Core Composition[1] | Shell Composition[2] |
|---|---|---|
| 1 | 63.5 EA/35.8 Sty/0.7 DVB | 75 Sty/25 MATS |
| 2 | 49.65 EA/49.65 Sty/0.7 DVB | 75 Sty/25 MATS |
| 3 | 49.65 EA/49.65 Sty/0.7 DVB | 75 Sty/25 VTMS |
| 4 | 49.95 EA/49.95 Sty/0.1 DVB | 75 Sty/25 MATS |
| 5 | 49.95 EA/49.95 Sty/0.1 DVB | 75 Sty/25 VTMS |
| 6 | 50 EA/50 Sty/0 DVB | 75 Sty/25 MATS |
| 7 | 50 EA/50 Sty/0 DVB | 75 Sty/25 VTMS |

[1] percent by weight based on the total monomer weight of the core
[2] percent by weight based on the total monomer weight of the shell

EXAMPLE 2: TENSILE STRENGTH OF SAMPLES OF CURE TEMPERATURE OF 150° C.

The following results were obtained for tensile strength. All samples were had cure temperature of 150° C.

| Tensile Strength (g/in) (150° C.) | | | |
|---|---|---|---|
| Sample | dry | wet | IPA |
| Comp1 | 7131 | 3643 | 5249 |
| Comp2 | 4914 | 2444 | 2503 |
| Comp3 | 5365 | 2330 | 3874 |

-continued

| Tensile Strength (g/in) (150° C.) | | | |
|---|---|---|---|
| Sample | dry | wet | IPA |
| 1 | 6984 | 2279 | 4691 |
| 2 | 6198 | 2124 | 4677 |
| 3 | 5585 | 1353 | 3649 |
| 4 | 6629 | 2207 | 4702 |
| 5 | 5805 | 1554 | 3610 |
| 6 | 7028 | 2447 | 4963 |
| 7 | 6325 | 1811 | 3882 |

In the above table, all the samples 1-7 have tensile strength that is comparable to the commercial formaldehyde-generating binders Comp1 and Comp2. This result shows that all the samples 1-7 provide enough tensile strength to be useful as binders for nonwoven textiles.

Also, all of samples 1-7 had tensile strength that was comparable to or better than the commercial non-formaldehyde-generating binder Comp3. This result shows that the present invention provides non-formaldehyde-generating crosslinking that is superior to previously available non-formaldehyde-generating binders.

EXAMPLE 3: TENSILE STRENGTH RETENTION AS A FUNCTION OF CURE TEMPERATURE

Two types of tensile strength retention were assessed as a function of cure temperature. "Wet retention" is the quotient of wet tensile strength divided by the dry tensile strength, expressed as a percentage. "IPA retention" is the quotient of IPA tensile strength divided by the dry tensile strength, expressed as a percentage. Results were as follows:

| | Cure Temp: | | | | | |
|---|---|---|---|---|---|---|
| | 120° C. | | | 100° C. | | |
| Sample | Dry | Wet | IPA | Dry | Wet | IPA |
| Comp1 | 8188 | 3408 | 5755 | 5978 | 1864 | 3849 |
| Comp3 | 6062 | 2075 | 3947 | 5220 | 1413 | 2893 |
| 6 | 6566 | 1815 | 5057 | 5769 | 1329 | 4281 |
| 7 | 6751 | 1640 | 4337 | 6145 | 1473 | 3857 |

| | Retention: | | | | | |
|---|---|---|---|---|---|---|
| | Wet | | | IPA | | |
| | Cure Temp: | | | | | |
| Sample | 150° C. | 120° C. | 100° C. | 150° C. | 120° C. | 100° C. |
| Comp1 | 51.1 | 41.6 | 31.2 | 73.6 | 70.3 | 64.4 |
| Comp3 | 43.4 | 34.2 | 27.1 | 72.2 | 65.1 | 55.4 |
| 6 | 34.8 | 27.6 | 23.0 | 70.6 | 77.0 | 74.2 |
| 7 | 28.6 | 24.3 | 24.0 | 61.4 | 64.2 | 62.8 |

The retentions of Comp1 and Comp3 are strongly dependent on cure temperature, both in the case of wet retention and the case of IPA retention. This result shows that cure (that is, the latent crosslinking) of Comp1 and Comp3 is not complete after curing at 100° C. In contrast, samples 6 and 7 (examples of the present invention) show retentions that are much less dependent on cure temperature, especially in the case of IPA retention. This result shows that samples 6 and 7 cure effectively at cure temperature of 100° C.

EXAMPLE 4: LATEX STABILITY

After emulsion polymerization, the viscosity of each aqueous composition was measured. Then a portion of the aqueous composition was stored at 50° C. for 7 days, and the viscosity was measured again. Viscosity was measured at 25° C. with a Brookfield LV viscometer, spindle #2, at 60 rpm.

The following examples were tested for stability. Results of testing of pH and viscosity were as follows. Measurements before storage are "init" and after storage are "1 W."

| sample | init pH | 1 W ph | init viscosity (mPa*s) | 1 W viscosity (mPa*s) |
|---|---|---|---|---|
| 1 | 8.5 | 6.0 | 52 | paste |
| 3 | 3.2 | 3.4 | 24 | 21 |
| 4 | 8.5 | 5.1 | 24 | 28 |
| 7 | 7.9 | 4.8 | 43 | 44 |

What is claimed is:

1. An aqueous composition comprising latex polymer particles that comprise
    (a) 40% to 95%, by weight based on the dry weight of the latex polymer, a core polymer that comprises
        (i) 95% to 100% by weight, based on the dry weight of the core polymer, polymerized units of one or more monofunctional vinyl monomers, and
        (ii) 0% to 5% by weight, based on the dry weight of the core polymer, polymerized units of one or more multivinyl monomers,
        wherein the amount by weight based on the dry weight of the core polymer, of all monomers other than alkyl (meth)acrylates, styrene, and multivinyl monomers, is 0 to 3% by weight and
    (b) 5% to 60%, by weight based on the dry weight of the latex polymer, a shell polymer that comprises
        (i) 35% to 95% by weight, based on the dry weight of the shell polymer, polymerized units of one or more monofunctional vinyl monomers, and
        (ii) 5% to 65% by weight, based on the dry weight of the shell polymer, polymerized units of one or more vinyl monomers having a latent crosslinking group selected from the group consisting of trialkoxysilyl groups, oxoacetyl groups, and mixtures thereof,
        wherein the amount by weight based on the dry weight of the shell polymer, of all monomers other than alkyl (meth)acrylates, styrene, and vinyl monomers having latent crosslinking groups selected from trialkoxysilyl groups, oxoacetyl groups, and mixtures thereof, is 0 to 3% by weight.
2. The aqueous composition of claim 1, wherein said core polymer has Tg of 40° C. or lower.
3. The aqueous composition of claim 1, wherein said vinyl monomers having a latent crosslinking group have structure V or VI

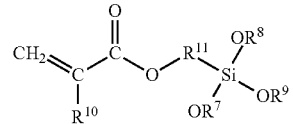

V

-continued
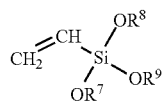
(VI)
wherein $R^7$, $R^8$, and $R^9$ is each an alkyl group having 6 or fewer carbon atoms, $R^{10}$ is either H or methyl, and $R^{11}$ is a divalent alkyl group.
4. A method of making a nonwoven textile comprising bringing the composition of claim 1 into contact with a collection of fibers.
5. A nonwoven textile made by the method of claim 4.
* * * * *